United States Patent [19]

Block et al.

[11] 4,405,942

[45] Sep. 20, 1983

[54] METHOD AND SYSTEM FOR SECURE TRANSMISSION AND RECEPTION OF VIDEO INFORMATION, PARTICULARLY FOR TELEVISION

[75] Inventors: Robert S. Block, Marina Del Ray, Calif.; John R. Martin, Milwaukee, Wis.

[73] Assignee: Telease, Inc., Los Angeles, Calif.

[21] Appl. No.: 354,376

[22] Filed: Mar. 3, 1982

Related U.S. Application Data

[63] Continuation of Ser. No. 124,656, Feb. 25, 1981, abandoned.

[51] Int. Cl.³ .......................... H04N 7/16; H04K 1/04
[52] U.S. Cl. ..................................... 358/119; 358/123
[58] Field of Search ................ 358/114, 117, 119, 123

[56] References Cited

U.S. PATENT DOCUMENTS 2,972,008  2/1961  Ridenour et al. .................... 358/123
4,070,693  1/1978  Shutterly ............................. 358/123

Primary Examiner—S. C. Buczinski

Attorney, Agent, or Firm—Burns, Doane, Swecker & Mathis

[57] ABSTRACT

A method and a system for secure transmission and reception of a video signal wherein parts of the video signal arranged in a first predetermined sequence are delayed in relation to each other to form an encoded video signal having its parts rearranged in sequence relative to their positions in the first predetermined sequence. Rearrangement of the video signal parts is accomplished by storing successive parts of the video signal and retrieving the stored parts so that the transmitted video signal has in parts arranged in a sequence other than their normal sequence. A decoder at a remote location is provided for receiving and restoring the transmitted sequence of video signal parts to its original sequence. In a television scrambling system, the parts of the video signal are fields, lines or segments of lines and, rearrangement of the sequence of video signal parts is accomplished on a line segment, line or field basis. Codes may be transmitted to the remote location with the video signal or otherwise to indicate the manner in which the parts of the video signal have been rearranged.

40 Claims, 19 Drawing Figures

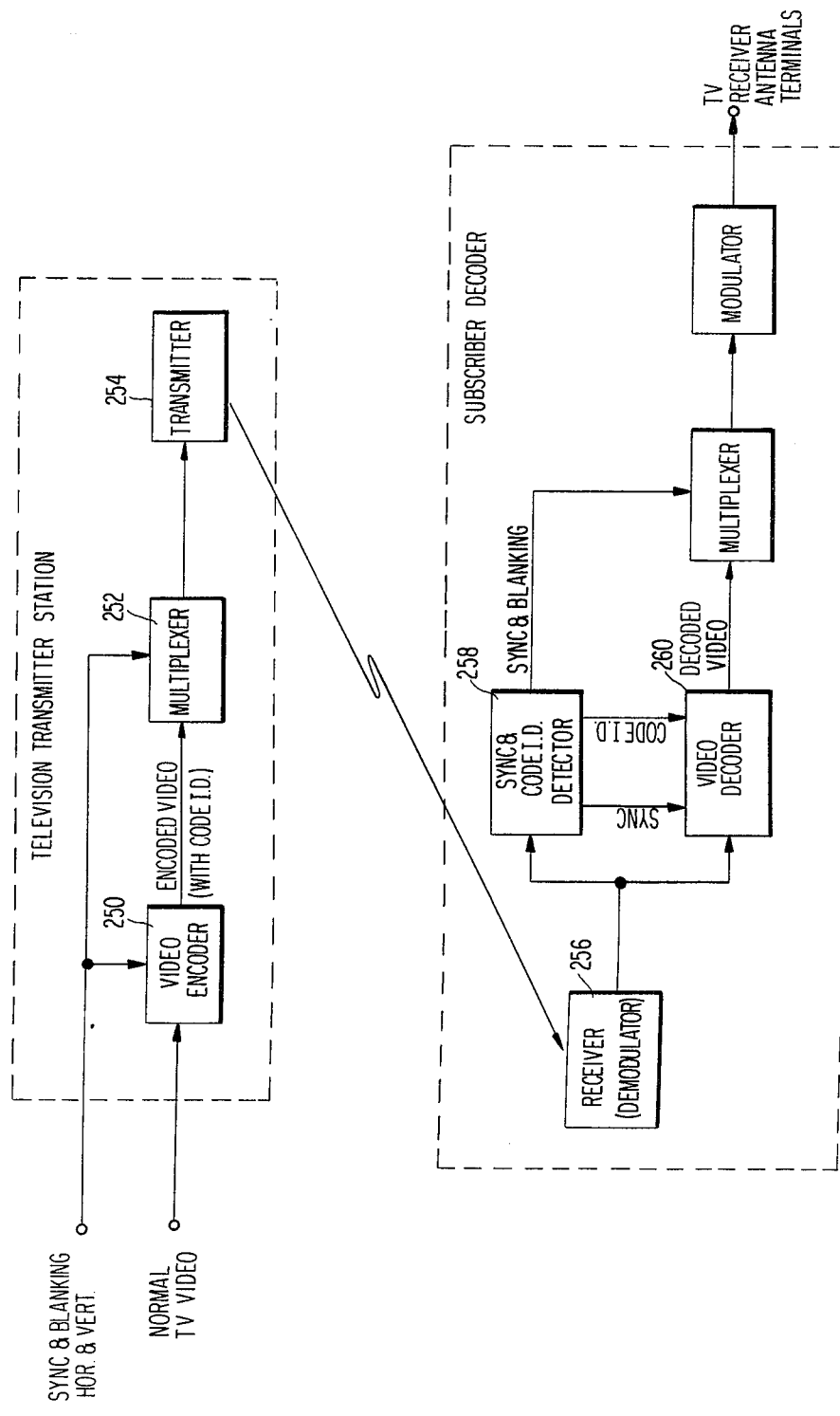

METHOD AND SYSTEM FOR SECURE TRANSMISSION AND RECEPTION OF VIDEO INFORMATION, PARTICULARLY FOR TELEVISION

This is a continuation of application Ser. No. 124,656, filed 2/25/81, now abandoned.

BACKGROUND OF THE INVENTION

The present invention relates to the encoding and decoding of video information and, more particularly, to a method and system for secure transmission of television signals for subscription television or similar video services in which only authorized viewers are permitted to view a video program.

With the increased interest and activity in the field of subscription or pay video transmissin of all types (e.g., broadcast and cable subscription television, long distance satellite transmission, television transmission of textual information, etc.), there has arisen a need for more secure transmission of high quality video information. To this end, numerous video encoding or scrambling techniques have been developed and some are now in use, particularly in broadcast systems where there is no control over who receives the signals and thus the signals must be encoded to prevent unauthorized use of the received signals.

One broadcast subscription television system now in use in Los Angeles transmits a video signal that has been modulated by a sine wave signal such that the blanking and synchronizing levels cannot be recognized by a normal television receiver. The display, without decoding, is thus unintelligible or at least very annoying to a viewer. However, it has been reported that by rather simple means available in most electronics stores, the system may be readily defeated by non-subscribers. As this becomes more widely known to the public, the number of unauthorized viewers grows and the incentive to pay for the services diminishes. This, in turn, detracts from the desirability on the part of video program producers to permit the use of their programming, particularly if they are paid as a function of authorized viewers or revenues collected.

Other approaches to television signal scrambling have proven more secure and may, in fact, make it practically impossible to unscramble the video signals without highly sophisticated and extremely expensive equipment. One such approach is to invert lines or fields of video information on some basis that can be reproduced at the subscriber location to permit viewing of a normal picture. Thus, for example, one known system inverts alternate parts of the video information and a decoder at the subscriber location can reinvert those inverted portions to reconstitute the original video. Another known system inverts fields of video information on a random basis and sends a code with the scrambled video to instruct the decoder as to how the received video has been inverted.

Security tends to be adequate in approaches to video scrambling in which the video information is randomly inverted and a secure code is transmitted with the video so that the decoder can properly reinvert, but difficulties arise with respect to picture quality. For example, inversion and reinversion of video signals may result in a reconstituted video signal that varies in d.c. level from line-to-line or field-to-field. Because of this variation, a flicker or other annoying effect appears in the television display making it unpleasant for viewing.

Various measures have been employed to eliminate or at least reduce this problem with varying degrees of success. Clamping the video signals to the same d.c. level has been somewhat successful, but some annoying effects may still remain. Also, the additional circuitry required to eliminate or reduce the annoying effects of these types of scrambling add cost and complexity to the decoders. Less expensive and perhaps more effective approaches, such as less frequent inversion, have been suggested, but they seem to have a tendency to reduce the security of transmission and only serve to reduce the annoyance, not eliminate it.

OBJECTS AND SUMMARY OF THE INVENTION

It is accordingly an object of the present invention to provide a novel method and system for scrambling or encoding television signals wherein the difficulties of the prior art systems mentioned above are obviated.

It is a further object of the present invention to provide a novel television video encoding and decoding method and system in which there is an extremely high amount of security, wherein the encoding is sufficient to render an encoded television signal unintelligible or at least extremely annoying to watch, and wherein the decoded video signal is devoid of annoying abnormalities introduced during encoding, yet no special efforts must be made to eliminate encoding abnormalities.

It is another object of the present invention to provide a novel method and system for encoding and decoding television signals wherein the foregoing objects are accomplished with simplicity and at relatively low cost.

It is a more specific object of the present invention to provide a novel television signal scrambling system particularly suitable for broadcast pay television or other television systems meant only for authorized users where the video signal is encoded by delaying parts of the signal relative to other parts in a determinable manner to thereby rearrange the sequence of transmission of the parts in a fashion that can be reproduced at a remote location.

These and other objects and advantages are accomplished in accordance with the invention by a method, and a system that operates in accordance with the method, wherein parts of a video signal arranged in a first predetermined sequence are delayed in relation to each other to form an encoded video signal having its parts rearranged in sequence relative to their positions in the first predetermined sequence. Broadly, this rearrangement is accomplished by storing successive parts of the video signal and retrieving the stored parts in an order or sequence other than their normal sequence.

In accordance with one embodiment of the invention, rearrangement of the sequence of video signal parts is accomplished on a line basis or a field basis. For example, several lines of a video signal are stored in order as they are received. However, the lines are retrieved in a sequence different from that in which they are received and stored. Similarly, several fields of the video signal may be stored and retrieved in a sequence different from that in which they are received. Of course, as in the above-discussed embodiments, the rearrangement can be accomplished by the manner of retrieval or the manner of storage.

In another specific embodiment of the invention, the parts of the video signal chosen for delay are sequential samples or segments of the video signal either in an analog or digital form. The sequence of the samples is rearranged by delaying some longer than others, either individually or in groups, preferably by storing the samples sequentially as they are received and then retrieving the stored samples in a sequence other than that of receipt, or by storing the samples in a sequence other than the one in which they are received and then retrieving the stored samples in the stored sequence.

In one form of apparatus for encoding the video signal, a predetermined portion or part of the video signal (e.g. a horizontal line) is stored in a first storage location and then is transferred to a second storage location for storage therein. Before the portion of the video signal is stored in the second storage location, it is altered (e.g. by a gating arrangement), and the altered video signal is transmitted from the second storage location.

More specifically, in one form of the invention, a first group of samples representing one horizontal line of video (e.g., 256 segments which together constitute one line of video information) is serially stored in sequence in a serial in/parallel out storage device. This storage device may be a binary shift register if the samples are digital representations of the video, or an analog "bucket brigade" if the samples are analog representations of the video. When one full line of samples or video segments is stored, the segments are shifted in parallel into a second parallel in/serial out storage device so that the first storage device can accept the samples of the next line of video while the first stored segments are retrieved from the second storage device for transmission.

Rearrangement of the segments prior to transmission may be accomplished in various ways. The contents of the first storage device may be transferred to the second storage device without rearranging the sequence of samples. The stored samples in the second storage device then may be shifted out for transmission in a sequence rearranged in relation to their original sequence of storage in a determinable manner. For example, the samples may be shifted out so that the last received appears first in the transmitted signal or so that some intermediate sample appears first in the transmitted signal. An encoded video signal comprising a line of video having parts rearranged in sequence relative to corresponding parts of the normal video signal is thus transmitted.

Another way of rearranging segments prior to transmission is to transfer the contents of the first storage device into the second storage device in a sequence rearranged in relation to the original sequence of storage in a determinable manner. The contents of the second storage device are then shifted out in sequence resulting in an encoded video signal having parts of a line of video signal rearranged relative to corresponding parts of the normal video signal. This form of the invention permits any sample along a line to be rearranged to any position along that line or, with additional storage capacity, along any other line.

Since, in each embodiment of an encoder according to the invention, the video parts are altered such as by rearrangement of sequence in a determinable manner (either fixed or variable), a decoder which performs an opposite type of rearrangement will reconstitute the original, viewable form of the video signal.

The manner of rearranging the sequence of parts may be predetermined (i.e., fixed or preset) or may be controlled by a code generator that can vary the sequence from line-to-line or from field-to-field or on any other convenient time basis. The code produced by the code generator can be wholly or partially transmitted with the encoded video signal, e.g., in the horizontal or vertical retrace intervals, so that the exact nature of the rearrangement of parts can be determined by a decoder at a subscriber's location so that the original sequence of parts can be there reconstituted.

In one form of the invention, the code that determines the sequence of delay or rearrangement changes in a random manner and is transmitted in its entirety with the encoded video signal. A decoder at the subscriber location receives the code and reverses the delay procedure at the transmitting station in order to place the parts of the video signal in their normal sequence.

In another form of the invention, the code that determines the sequence of delay or rearrangement is predetermined and is only periodically changed, e.g., on a monthly basis. The new code is provided to the subscriber prior to the start of each month so that the subscriber's decoder can properly rearrange the parts of the encoded video signal and thus display a normal television picture. The code itself may also be ciphered so that a combination of the above techniques can be used. Thus, for example, the code that is needed for rearranging the encoded video signal may be itself changed in a predetermined manner before transmission. The manner in which it is changed may be communicated to a subscriber on a monthly basis so that the subscriber's decoder can only use the transmitted code properly if the encipher code is also known.

DETAILED DESCRIPTION

Figure 1A:
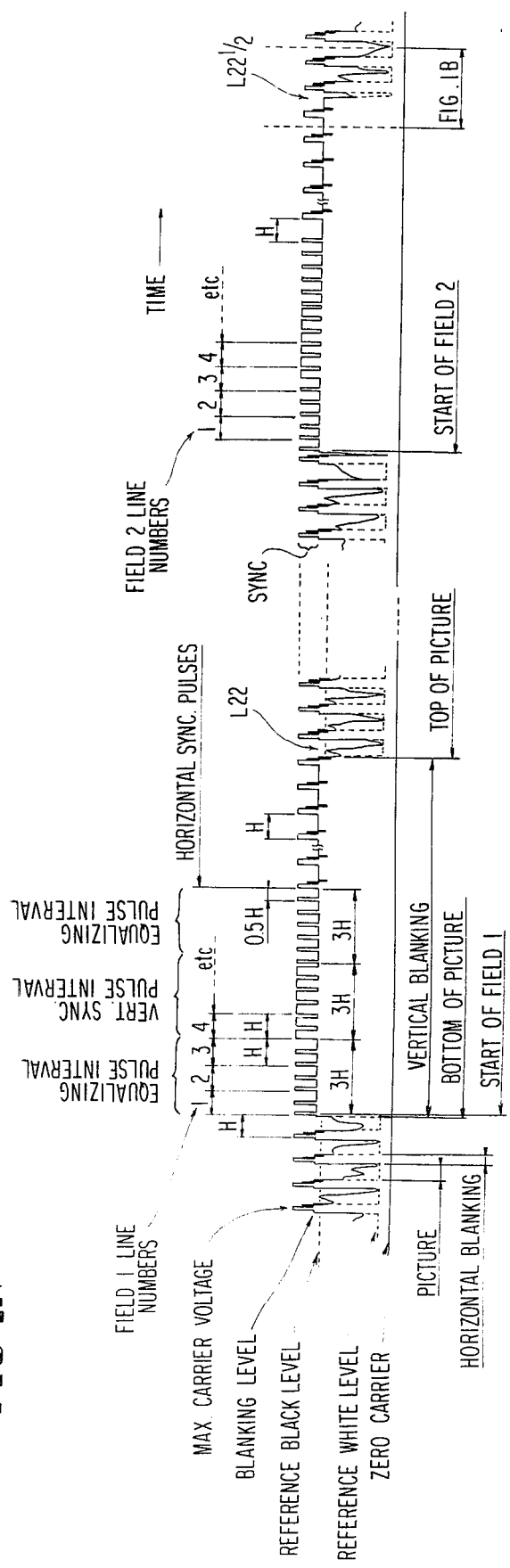
FIGS. 1A and 1B are illustrations of standard United States color television signals.
Figure 1B:
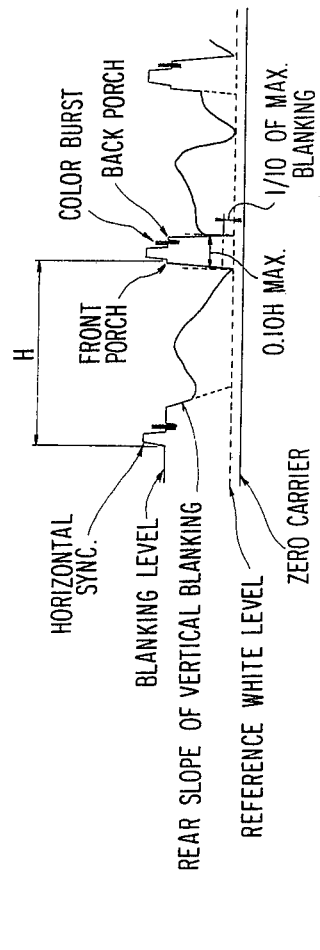

FIGS. 1A and 1B illustrate a standard or normal color television signal before it is superimposed on a carrier for transmission (or after demodulation).

This illustrated signal is the standard for the United States but it should be noted that the "standard or normal" television signal for other countries may differ somewhat. Accordingly, FIGS. 1A and 1B are illustrative of only one of a possible number of standard signals. As is illustrated in FIG. 1A, the standard color television signal is composed of consecutive fields each including synchronizing signals and video signals which convey color and "contrast" information. Each field commences with a vertical blanking interval comprised of equalizing pulses, vertical synchronization pulses and horizontal synchronization pulses. At the TV receiver, this vertical blanking interval (i.e. the blanking pulse) blanks the cathode ray tube beam as it is returned from the bottom to the top of the display (TV screen), and the horizontal scanning circuits are stabilized in synchronization with the horizontal sync pulses prior to the arrival of the first horizontal line of video information.

At the end of the vertical blanking interval, a horizontal sync pulse signifies the start of the scanning of a line of video information from one edge of the television display or picture tube to the other edge, normally from left to right when viewed from the front of the picture tube. The video signal information modulates the electron beam (or electron beams in a color system) as the beam is scanned. A horizontal blanking pulse blanks the retrace of the electron beam from right to left and a horizontal sync pulse then signifies the start of the next line of video information. Two consecutive lines of video information (actually 1½ consecutive lines of a second field of video information) are shown in FIG. 1B.

Figure 1C:
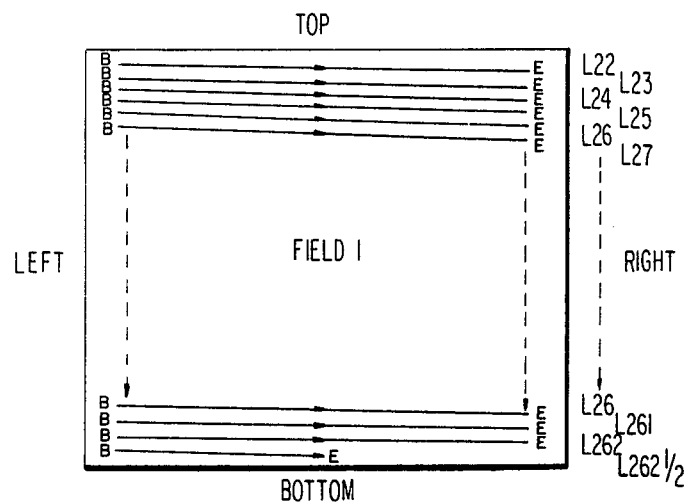
FIGS. 1C and 1D are pictorial representations of the scanning of two successive fields of video information on a television picture tube in response to the signals of FIGS. 1A and 1B.
Figure 1D:
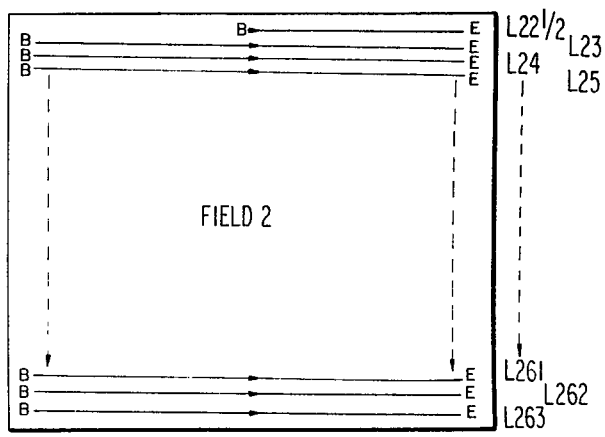

The result of scanning two consecutive fields of video information as seen by a viewer on the face of the picture tube is illustrated in FIGS. 1C and 1D. As can be seen in FIG. 1C, the face of the cathode ray picture tube is scanned with video information starting at the top left and ending at the bottom right of the display. Since the first 21 horizontal sync pulses are used to stabilize the horizontal sync circuits during vertical blanking, the first visible scan line of the first field is line 22(L22). Moreover, in the first field, for purposes of interlacing with the second field, the last line scanned is a half line. Thus, the first field can be viewed as containing lines 22 through 262½ to facilitate the description. The second field is similar except that for the purpose of interlacing the very first line scanned is a half line and the last line is a while line. Thus, the second field can be viewed as containing lines 22½ though 263. In FIGS. 1C and 1D, the beginning and end of each horizontal scan line is designated B and E, respectively, again to facilitate an understanding of the present invention.

In accordance with the invention, the normal TV video signal is encoded or scrambled such that if the encoded signal were displayed by a standard television receiver without decoding, the resultant picture presented to the viewer would have parts rearranged in sequence relative to their normal positions in the scanning sequence. The parts that are rearranged may be individual scan lines (e.g., the sequence of scan lines in a field) the fields, or other parts of the video signal such as individual segments of a scan line. As will be appreciated this rearrangement of sequence of video signal parts will result in a picture that is unintelligible or at least very annoying to watch.

To facilitate an understanding of the invention, the manner in which video information, encoded in accordance with the present invention would be presented on a TV display without proper decoding is illustrated in FIGS. 2–6.

Figure 2:
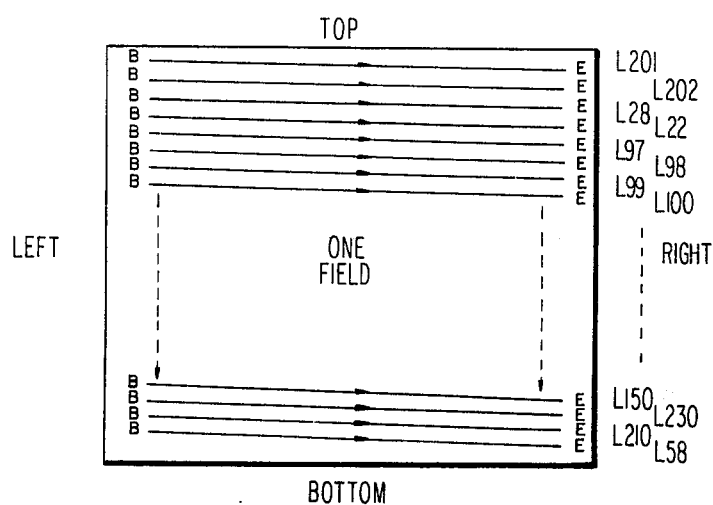
FIGS. 2–5, 6A, 6B, and 6C are pictorial representations of a standard television picture tube with lines scanned with signals encoded in accordance with various embodiments of the present inventions.

FIG. 2 generally illustrates one display resulting from the encoding technique of the present invention in which the sequence of individual horizontal lines of video information is rearranged in a determinable manner relative to the normal sequence of lines in a field of video information. Normally, the first line appearing at the top of the video display would be line 22 (or 22 ½) and the last line would be 262 ½ (or 263). In one embodiment of the invention described hereinafter in greater detail, the individual horizontal lines are rearranged so that if they were displayed without decoding, they would reappear in a sequence other than the normal sequence. Thus, for example, line 201 (L201) would be scanned first at the top of the TV display. This would be followed in sequence by line 202, line 28, line 22, etc., as illustrated in FIG. 2. The resultant display would thus be unintelligible unless the lines were rearranged to their normal sequence prior to display.

Figure 3:
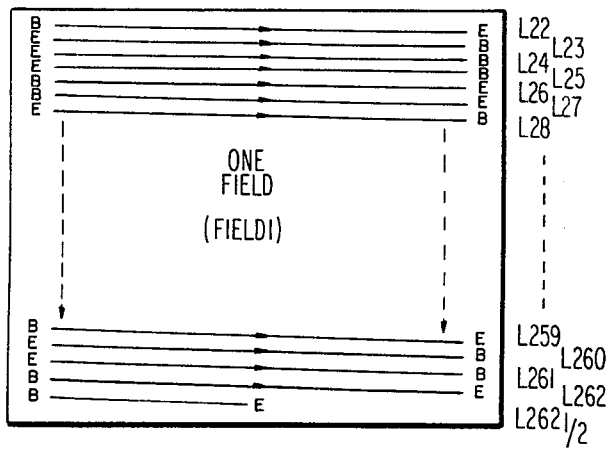
Figure 4:
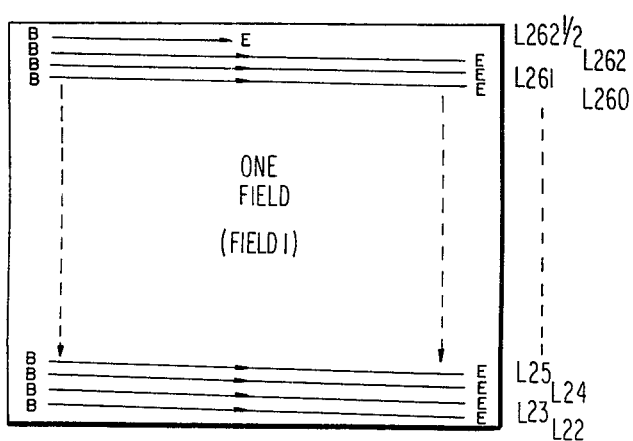

FIG. 3 illustrates the display resulting from encoding in accordance with another form of the invention. In FIG. 3, the lines are scanned in their normal sequence, i.e., each horizontal line of video is transmitted and received in its normal order, but the video signal or information content of selected horizontal lines is reversed in a determinable manner so that the video information normally appearing at the end of the line is first and thus appears at the beginning of the line. The selected lines therefore appear on the display as being reversed and when intermixed with normally scanned lines produces a scrambled, unintelligible display unless selective reversal is effected prior to display.

Figure 5:
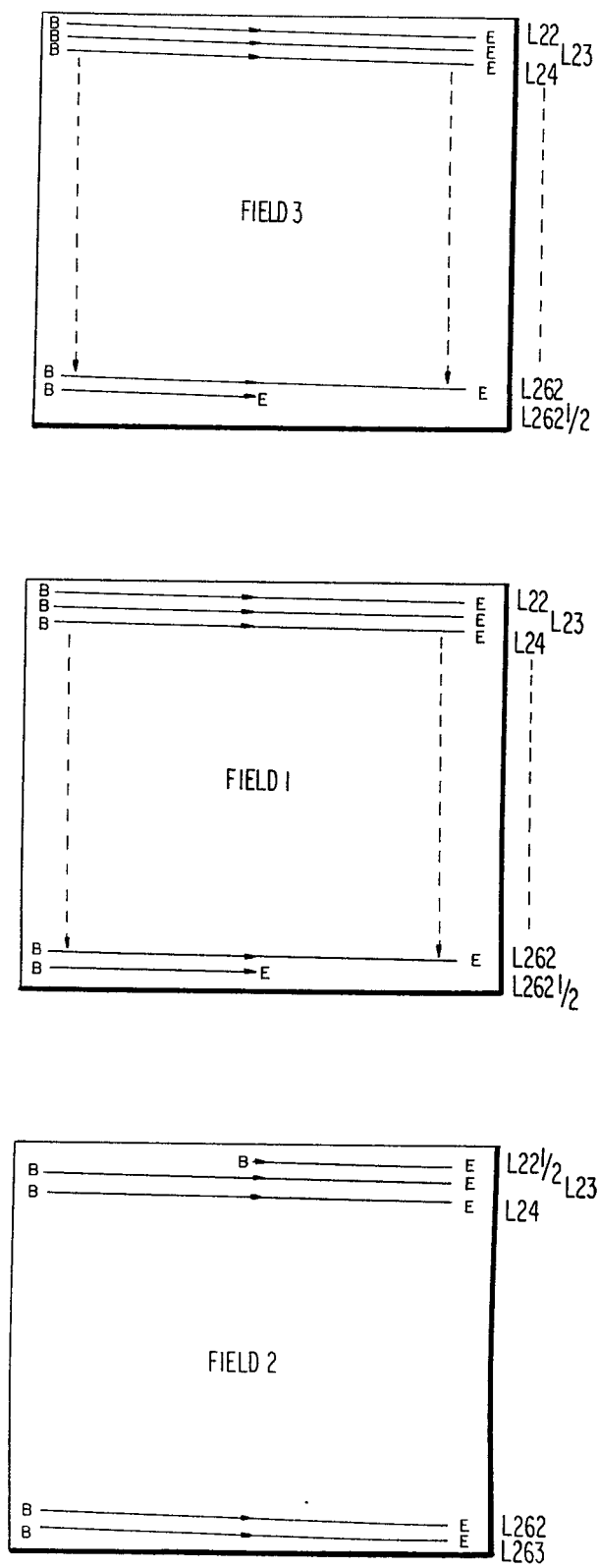

FIG. 5 illustrates a further form of the invention wherein the sequence of scan lines of video information is normal but the order of the fields is rearranged. More specifically, an entire field of information is transmitted out of order relative to its normal sequence so that, for example, the third field is received and displayed prior to the first field and the second field. Rearrangment of fields in this manner may encompass a number of fields in any desired rearrangement as will subsequently be described in greater detail.

It will be appreciated from the foregoing and subsequent description that other rearrangments of parts of the video signal may be employed to encode the television signal. For example, combinations of line reversal and field reversal may be employed either together or on an alternating basis. Moreover, smaller parts of the video signal such as portions of horizontal lines may be rearranged to encode the TV video.

Figure 6A:
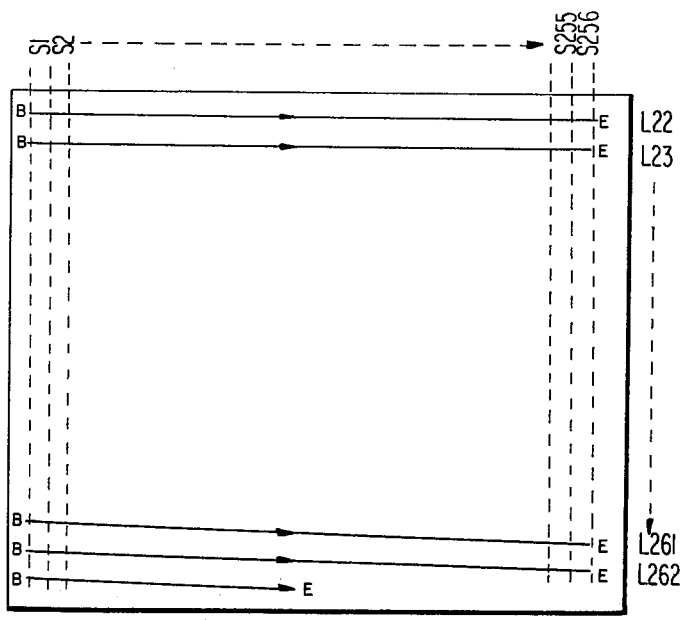

FIG. 6A, for example, illustrates a normal television display with the individual horizontal scan lines divided into a plurality of segments, i.e., 256 segments in the illustrated example. The individual horizontal lines are not normally segmented in this fashion can be readily segmented by suitable analog or digital sampling techniques as will be described hereinafter in greater detail. The sampling that is accomplished will provide the segments in a predetermined order and if this order is maintained throughout transmission and reception, the display will be that of an ordinary television signal. However, in accordance with one embodiment of the present invention, the segments are rearranged relative to their normal order prior to broadcast or other transmission as is illustrated in FIGS. 6B and 6C.

Figure 6B:
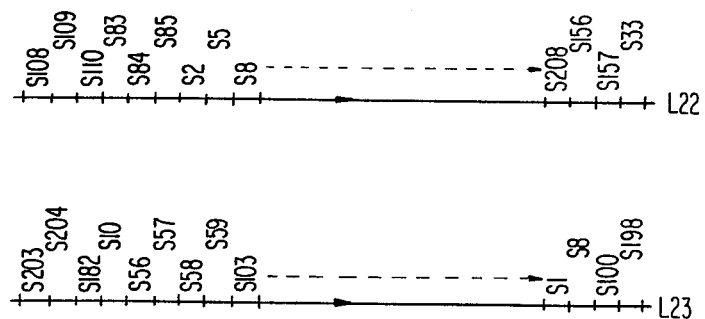
Figure 6C:
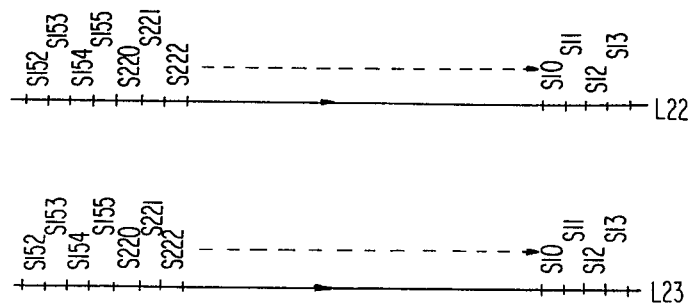

One manner or rearranging the segments shown in FIG. 6B provides for the rearrangement of segments in a different fashion for each scan line. As is shown in FIG. 6C, however, the rearrangement of the segments of the horizontal line can be maintained, once established for the first scan line, throughout any number of scan lines including all the lines that make up one or more fields.

All of the foregoing encoding techniques illustrated in FIGS. 2-6 involve the delay of some part of a video signal relative to other similar parts so that the various parts are rearranged in sequence upon transmission and produce an abnormal display if not properly decoded. Of course, the manner of rearranging the parts is determinable either in the sense that it is fixed (predeterminedly) and can be reversed by a similar fixed decoding technique or in the sense that it varies in response to an identifiable code that is provided to the decoder. According, in either case a decoder operating in a reverse manner can reconstitute the original signal from the rearranged parts.

Moreover, it should be understood that while the normal or standard TV video signal is often thought of as a composite signal comprising both sync signals and video information, the term video signal as used herein refers to the video information that determines picture content and thus is peculiar to a particular line or field, unless it is stated otherwise. Therefore, when rearrangement of a part of the video signal is discussed, it is contemplated that the sync pulses and other television signal components that are not peculiar to any particular line or field are not encompassed by this term. It will, however, be appreciated that these other signal components are also be rearranged for convenience or for other purposes in addition to or in conjunction with the video signal rearrangement contemplated herein without departing from the essential characteristics of this invention.

Various embodiments of the invention for delaying and rearranging parts of the video signal are described hereinafter in greater detail in connection with FIGS. 7-11. In general, the manner of carrying out the present invention involves rearranging the sequence of parts of the normal video signal through the use of a suitable mechanism that will delay the video signal parts in a controllable manner. A storage medium such as a digital memory device, a sample and hold device or like digital or analog storage devices may be arranged to provide such controlled delay.

Figure 7:
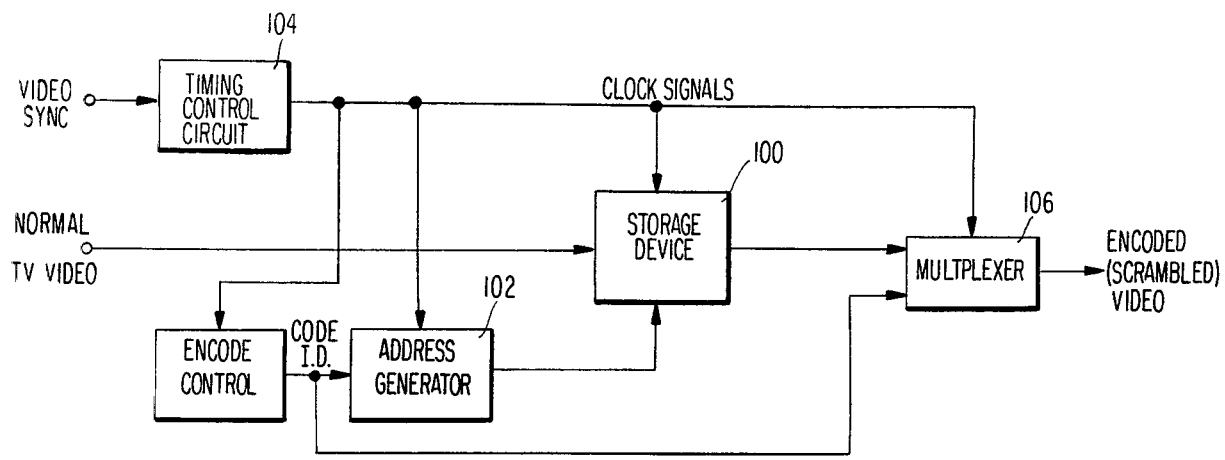
FIG. 7 is a functional block diagram of one general embodiment of the present invention.

Referring to FIG. 7, for example, the normal TV video signal may be supplied to a suitable storage device 100 and there stored in predetermined storage locations. These locations may be, for example, sequential locations in the sense that the addresses of stored sequential parts of the video signal are sequential. An address generator 102 controlled by clock signals from a timing control circuit 104 reads the stored parts of the TV video signal from the storage device 100 and applies the stored signals to the input terminals of a conventional multiplexer 106 in synchronism with normal video timing (synchronization) signals to reconstitute a television signal that appears normal in the sense that the overall timing of lines and fields is normal. However, the addresses produced by the address generator 102 are such that the stored signals are read in a sequence other than the sequence in which the signals were stored. For example, the address generator 102 may generate a sequence of addresses different from the sequence of memory addresses in which the normal TV video signal was stored initially thus reading the video information from memory in a sequence differing from its normal sequence. Thus, the video content of the television signal at the output terminal of the multiplexer, while conveying the same information, is in a sequence other than its normal sequence.

The address generator 102 may be any suitable conventional circuit that produces a series of digital words or other suitable addresses of a reprocucible sequence (e.g., a psuedo-random sequence) in which case the decoder need only reproduce this same, known sequence to rearrange the video signal parts in their proper sequence. For additional security or as an alternative for ease of decoding, a code from an encode control circuit 108 may control the sequence of addresses generated by the address generator 102 and a code ID signal identifying the mode of operation of the address generator may also be supplied to the multiplexer 106 for transmission with the signals read from the storage device 100. In either case, the signals from the multiplexer 106 form an encoded or scrambled video signal that has parts rearranged from their normal sequence in a determinable manner relative to other parts.

For example, several entire fields of video may be stored in their normal sequence in the storage device 100 and then addressed for output to the multiplexer 106 in a sequence other than the sequence of storage. While the fields of video information are read from memory, the normal TV video arriving at the storage device is continuously stored so that none of the information is lost. The encode control may alter the code ID to change the sequence of addresses from the address generator 102 at the end of some predetermined number of fields or on some other basis synchronized with the video sync information so that the sequence of fields is changed periodically. Similarly, lines of video information or other parts of the video signal may be stored in the storage device 100 and clocked or read out in a sequence other than the sequence in which they are stored.

It will be appreciated that the normal TV video signal may be stored in the storage device 100 in a sequence of locations other than consecutive locations and then the storage locations of the storage device 100 may be read consecutively. This also results in an output having a sequence other than the input sequence. In this latter arrangement, the encoding of addresses is accomplished on the input to the storage device as opposed to the output thereof.

Figure 8:
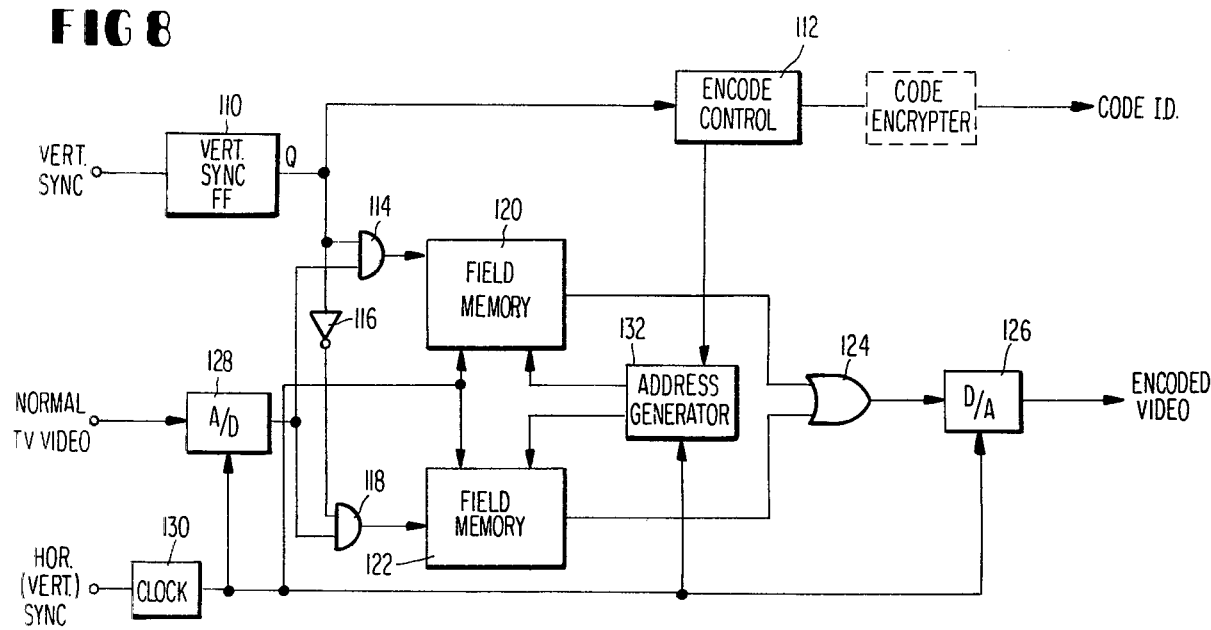
FIG. 8 is a functional block diagram of a more specific embodiment of an encoder according to the present invention wherein fields of video information are rearranged.

FIG. 8 illustrates one specific form of the invention wherein the normal TV video is converted to digital form for storage and rearrangement and is then reconverted to analog form for transmission. The embodiment of FIG. 8 is specifically arranged to provide the line rearrangement encoding of the FIGS. 2-4, but it should be noted that by adding additional field memories, the field rearrangement embodiment of the invention illustrated in FIG. 5 can also be implemented.

Referring now to FIG. 8, the vertical sync signal is applied to a toggle input terminal of a conventional flip-flop 110 (designated vertical sync flip-flop) and the binary "1" or Q output signal from the flip-flop 110 is applied to an encode control circuit 112, to an input terminal of an AND-gate 114 and through an inverter 116 to one input terminal of AND-gate 118. The output signal from the AND-gate 114 is supplied to an input terminal of a memory 120 of sufficient capacity to store an entire field of video information. The output signal from the AND-gate 118 is applied to a data input terminal of a similar field memory 122. The output terminals of the field memories 120 and 122 are connected to respective input terminals of an OR-gate 124, the output signal from which is applied to an input terminal of a digital-to-analog converter 126.

The normal TV video signal is converted to digital form in an analog to digital converter 128 and the digitized TV video signal is supplied to the other input terminals of the AND-gates 114 and 118. A TV video signal sync signal (either the horizontal or vertical sync) is applied to a synchronized clock 130 which generates the clock signals are supplied from the clock 130 to the analog to digital converter 128, the field memories 120 and 122, the address generator 132 and a digital to analog converter 126.

In operation, the normal TV video signal is digitized in a conventional manner by the analog to digital converter 128. For example, 16 distinct levels of video signal between black and white may be detected and encoded as four bit digital words by the converter 128. Thus, for example, the white information may be represented by an all zero's code (0000). The black information may be represented by an all one's code (1111). Intermediate levels in 14 intermediate steps may be represented by other combinations of zero's and one's. It is contemplated that about 256 samples of the video information levels will be taken and represented by a digital word for each horizontal line of video, since 256 is a convenient number in digital work and seems to be a sufficient number of samples to provide adequate resolution. However, it will be appreciated that 32 or some other convenient number of levels of video may be selected for the digital conversion, and a greater number of sampler along each line may be taken (e.g., 512).

During a first field of incoming TV video information, the flip-flop is in one binary state (either set or reset) and the first field is loaded into one of the field memories 120 and 122. Immediately before the next field of video information arrives, the flip-flop 110 changes state and the next field of video information is loaded into the other of the memories 120 and 122. Simultaneously, the address generator 132 clocks information out of the first loaded field memory (i.e. reads the contents of the first field memory to the OR-gate 124) in a sequence determined by the encode control 118. As this information is clocked out of the field memory, it is supplied through the OR-gate 124 to the digital to analog converter 126 for reconversion to analog form and transmission as the encoded video signal.

When all of the information for a field has been clocked out of the first loaded field memory, the second field memory will then contain a second field of video information. The sync flip-flop 110 changes state causing the next incoming field to be loaded into the memory that was just read while the previously loaded memory is read.

It will be appreciated that the address generator 132 may be controlled to clock the stored information out of the field memories in any number of ways. For example, the address generator may clock the horizontal lines out of memory on a line-by-line basis in a pseudo-random fashion wherein the starting point of the pseudo-random address sequence is controlled by the encode control 118. The resultant encoded video information would thus be arranged as illustrated in FIG. 2. Alternately, the address generator may be controlled to clock an entire field of information out of the field memories line-by-line in reverse of the order of storage (i.e. first line in, last line out) resulting in a display such as that illustrated in FIG. 4. Further encoding may be achieved by reversing the beginning and end of each line (e.g. by clocking the last stored segment out first and proceeding in this reverse sequence) so that without proper decoding the field is displayed upsidedown and backwards. By controlling this reversal of fields so that some are reversed and some are not, normal reception is impossible without knowledge of the existence and manner of the reversals, which information is provided by the code ID or by some predetermined, fixed order.

It will also be appreciated that by clocking the lines of video information out of the field memories in the normal line sequence but with some determinable reversal of line beginning and end (e.g. by reversing the segment order or otherwise mixing the segment order in a determinable fashion), another form of encoding such as that illustrated in FIG. 3, may be achieved with the FIG. 8 circuit. Moreover, since the video signal will be stored as a number of samples of each horizontal line, these samples or segments may be rearranged on an individual basis to produce encoding like that shown in FIG. 6. Of course, as will be seen hereinafter, entire fields of video information need not be stored to achieve line reversal or line segment encoding.

If the manner of rearranging the video signal sequence is fixed and predetermined, the decoder at a subscriber station need not receive any code information to properly restore the video to its normal sequence. On the other hand, if the video signal sequence is rearranged in response to a code that varies at the transmitter location, this code must be conveyed to the subscriber location. In this regard, the code may be transmitted with the television signal or by way of a separate communication link (e.g., by telephone) or by mail or by a combination of such means. Suitable techniques for supplying code information for unscrambling television signals are described, by way of example, in U.S. Pat. Nos. 4,025,948 and 4,068,264.

Figure 9:
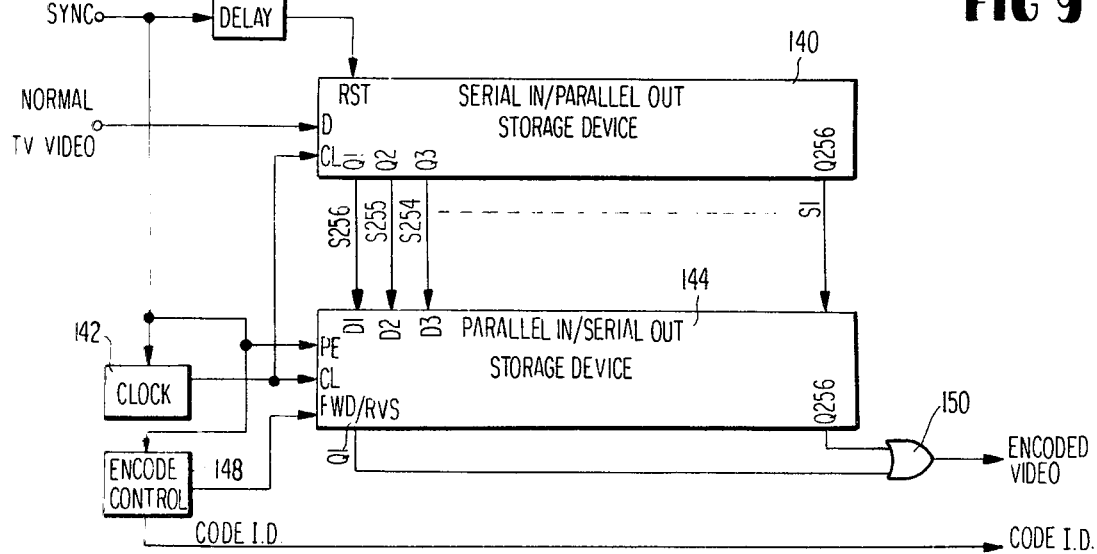
FIGS. 9 and 10 are functional block diagrams of particular embodiments of encoders according to the present invention wherein lines of video information are rearranged.
Figure 10:
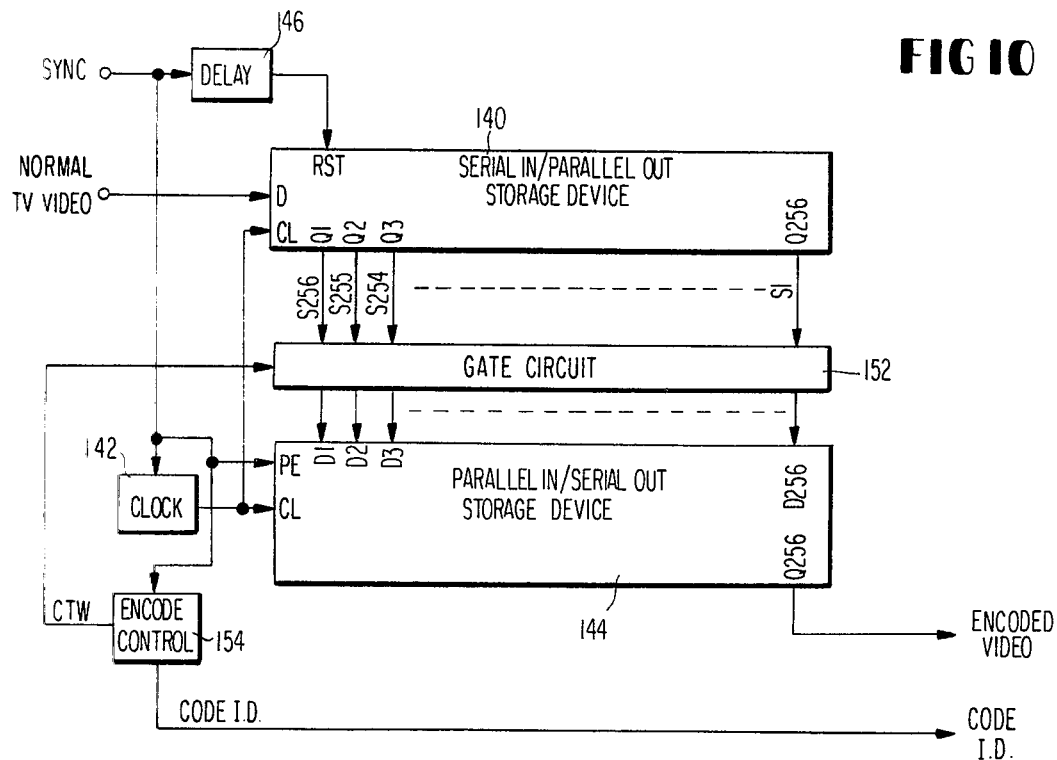

FIGS. 9 and 10 illustrate specific implementations of the invention in which the parts of the video signal that are rearranged are segments of horizontal scan lines. In the circuit of FIG. 9, the horizontal line segments are rearranged so that the lines are selectively reversed as shown in FIG. 3. In the FIG. 10 circuit, the segments of a horizontal line of video information are rearranged so that the individual segments within a horizontal line are in other than their normal sequence as shown in FIGS. 6B or 6C.

Referring to FIG. 9, the normal TV video signal is supplied to the data input terminal of a suitable conventional serial is supplied storage device 140. Segments of a horizontal line of video information (e.g., 256 segments or level samples) are stored by serially clocking the segments into the storage device 140 under the control of a clock signal from a conventional synchronized clock 142.

When the segments of one full line of video information are stored in the device 140, the horizontal sync pulse SYNC enables the parallel enable or read terminal PE of a suitable conventional parallel in/serial out storage device 144. The SYNC signal is also delayed by a conventional delay circuit 146 and resets the storage device 140 so that it is prepared to receive the next horizontal line of video.

As the next horizontal line of video is received and clocked into the storage device 140, the video information stored in the storage device 144 is clocked out. An encode control circuit 148 provides a forward/reverse signal to the forward/reverse shift input terminal of the storage device 144 and depending upon the value of this signal, the stored video signal is shifted out of the storage device either in a forward direction from the final stage Q256 or in a reverse direction from the first state Q1. An OR gate circuit 150 is connected to receive the signals from the respective first and final stages Q1 and Q256 of the storage device 144 to provide one or the other as the encoded video signal.

If the encode control circuit 148 applies the forward control signal to the storage device terminal FWD/RUS, the first segment stored (S1) will be clocked out first, followed in sequence by the second through the 256th segments. This, the line of video information segments will be identical in sequence to their normal sequence (i.e., their original sequence of storage). If, however, the reverse control signal is applied to the FWD/RVS terminal, the last stored segment of that line of video will be clocked out first, followed by the next to last through the first in sequence. Thus, the rerverse control signal will result in transmission of the line of video information in its reverse order (e.g., such as line L23 in FIG. 3).

By changing the forward/reverse signal from one state to the other, the normal and reversed lines can be interspersed in a manner which is determinable by reference to the CODE I.D. signal. This CODE I.D. signal can determine the reversals on a line-by-line basis in some desired fashion (e.g., random or predetermined) or can determine the reversals on a less frequent basis such as on a field-to-field basis by specifying a particular pattern of reversals for an entire field. In either event, transmission of the CODE I.D. signal with the television signal or over some other convenient communication channel will allow decoding of the television video at a subscriber station provided the decoder at that station is capable of responding properly to the received codes.

In FIG. 10, wherein like numerical designations are used to denote like components, the segments that comprise a line of the video signal are stored by the storage device 140 and transferred to the storage device 144 prior to the arrival of the next line. However, the segments are transferred through a gating circuit 152 controlled by a control word CTW from an encode control circuit 154. The control word controls the gate circuit 152 so that the segments 51 through S256 are stored in the storage device 144 in a sequence which is determined by the control word.

Thus, the segments may be stored in the storage device 144 in any sequence, including their original deuqence. The stored segments will be clocked out of the storage device 144 by shifting them out in one predetermined direction (or if desired for further encoding, in a selected one of two directions) and the encoded video output signal will thus be a sequence of segments arranged in a determinable pattern other than their original, normal sequence. Again, the CODE I.D. will permit the original sequence to be reconstituted at the subscriber location.

It should be understood that the above techniques for rearranging segmental parts of the video signal may be implemented on an analog or digital basis. For analog operation the storage devices 140 and 144 and the gate circuits 150 and 152 may be any suitable analog devices such as "bucket brigades", gated sample and hold circuits and analog gates of conventional design. Suitable conventional digital AND and OR gates as well as conventional digital shift registers may be used for a digital implementation. Such shift registers and gate components are well known and are readily adapted to the uses described.

In an analog implementation, the video signal may be supplied in its normal analog form and sampled at a desired clock rate to produce the desired number of samples or segments per horizontal line. Reconversion to analog form before transmission will not be necessary, of course.

In a digital implementation, e.g., using binary shift registers, the video signal must first be converted to digital form before storing and rearranging the signal parts. Because of present bandwidth constraints on transmission, however, reconversion to analog form for transmission is desirable. Also, reconversion to analog form for transmission prevents the loss of a digital bit of information that might grossly affect the value of a particular segment upon decoding and display.

It will be understood by those skilled in the art that for digital video manipulation the individual segments of a line must be represented by several digital bits and not just one. For example, each segment may be represented by a four-bit binary word. The registers must thus handle several bits (a multiple bit word) for each segment. Since there is a reconversion to analog form before transmission, these digital words may be handled by conventional parallel data storage techniques. This facilitates keeping track of all the bits for a particular segment and facilitates the conversions from analog to digital and back to analog.

The gate circuit 152 may be any suitable conventional gating or switching arrangement that responds to the control word CTW to route the segments S1–S256 in variable patterns to the terminals D1–D256 of the storage device 144. One manner in which this may be accomplished is to provide an eight bit control word which will provide up to 256 variations so that each individual segment can be stored in any one of the 256 locations D1–D256 (with provision, of course, that there are no duplications for a particular code). Similarly, a four bit word may be used if, for example, only 16 different storage patterns are desired.

Table I below illustrates one possible coding format where an eight bit code word is used to determine the storage location of the individual segments. The gating circuit in the Table I illustration applies the segments S1–S256 to the respective D256–D1 locations i.e. without rearrangement) for an all zero's code (00000000) so that the first segment S1 is read out first followed by the second segment S2 and so on, in order, when the storage device 144 is clocked serially. For all one's code (11111111) or the binary equivalent of decimal 255, the gating circuit applies the last segment 5156 to the last storage location D256 so that it is read out first when storage device 144 is serially read. For codes between all zero's and all one's (the decimal number 1-254), the segments will be shifted in location in direct proportion to the code value.

TABLE I

| CODE | STORAGE LOCATION | | | | | |
|---|---|---|---|---|---|---|
| (DECIMAL) | D1 | D2 | D3 | D4 | D5 | ...D256 |
| 0 | S256 | S255 | S254 | S253 | S252 | ...S1 |
| 1 | S1 | S256 | S255 | S254 | S253 | ...S2 |
| 2 | S2 | S1 | S256 | S255 | S254 | ...S3 |
| 3 | S3 | S2 | S1 | S256 | S255 | ...S4 |
| . | . | . | . | . | . | . |
| . | . | . | . | . | . | . |
| 255 | S255 | S254 | S253 | S252 | S251 | ...S256 |

Table II below illustrates another possible coding format in which a four bit code word is used to determine the storage locations of the individual segments within one of a possible sixteen patterns (i.e. a four bit word can assume 16 different values). The all zero's code word controls the gate circuit 152 to arrange the segments in the storage device 144 in their original, unaltered sequence as shown in the first line of Table II. The all one's code word (1111), the decimal number 15, controls the gate circuit 152 to arrange the segments in reverse order in storage device 144. Various other different patterns of storage rearrangement are provided by the code words corresponding to the decimal number 1-14.

TABLE II

| CODE | STORAGE LOCATION | | | | | |
|---|---|---|---|---|---|---|
| (DECIMAL) | D1 | D2 | D3 | D4 | D5 | ...D256 |
| 0 | S256 | S255 | S254 | S253 | S252 | ...S1 |
| 1 | S10 | S105 | S203 | S2 | S8 | ...S100 |
| 2 | S26 | S123 | S126 | S98 | S215 | ...S226 |
| . | . | . | . | . | . | . |
| . | . | . | . | . | . | . |
| 16 | S1 | S2 | S3 | S4 | S5 | ...S256 |

Figure 11:
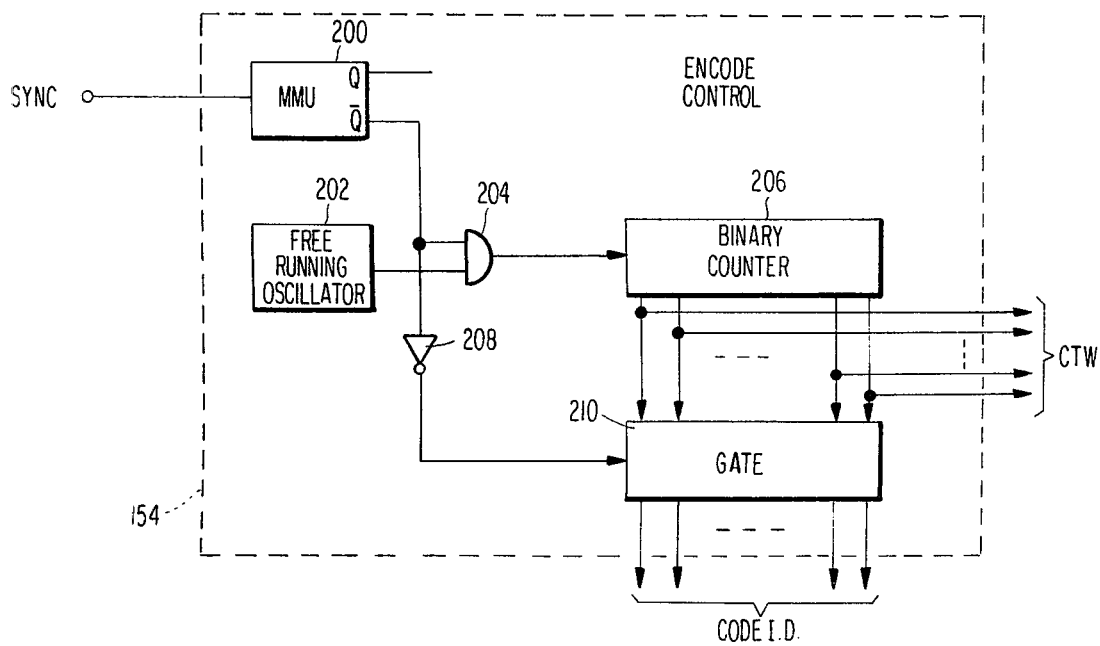
FIG. 11 is a more detailed functional block diagram of an encode control circuit which may be employed in conjunction with the present invention.

The encode control circuit 154 and the gate circuit 152 may be implemented to providing segment rearrangement using known digital techniques. For example, as is shown in FIG. 11, the encode control circuit 154 may be any suitable random or pseudo-random code generator that produces a multiple bit code word during an appropriate time period (e.g. at the end of each horizontal line) to gate the stored video information from one storage device to the other in accordance with a pattern determined by the code.

In this regard, the encode control may comprise a monostable multivibrator 200 which triggered by an appropriate one of the sync signals, depending upon how often information is transferred. When used in conjunction with the FIG. 10 embodiment, the horizontal sync pulse may be used to trigger the multivibrator.

The binary zero output signal Q from the multivibrator controls the gating of pulses from a free running clock 202 through an AND gate 204 to the clock input terminal of a binary counter 206. The multivibrator output signal is also inverted by an inverter 208 and applied to a gate 210. An output signal from each stage of the counter 206 together form the control word CTW and are gated through the gate 210 to form the CODE I.D. signal.

In operation, the multivibrator output signal is normally high or binary ONE and allows the oscillator signal to pass through the AND gate 204. Thus, before a horizontal sync pulse arrives, the counter is freely counting and the control signal CTW is changing.

When the horizontal sync pulse arrives, the multivibrator signal assumes a low signal level for a period determined by the multivibrator time constant. The binary counter 206 no longer receives clock signals so it stops counting and its output stays the same for the duration of the low level or zero multivibrator output signal.

The CTW signal is applied to the gate circuit 152 of FIG. 10 and, by choosing appropriate delays, the video information is tranferred through the gate circuit while the CTW signal is fixed in value. Also, the CODE I.S. signal is either sampled directly or through the gate 210 for transmission withthe encoded video signal.

At the end of the time period of the multivibrator, the Q output signal assumes a high signal level and the counter 206 once again counts pulses from the oscillator. Since no information is being transferred through the gate circuit 152 during this interval, the changes in the CTW signal do not have any adverse affect.

Figure 12:
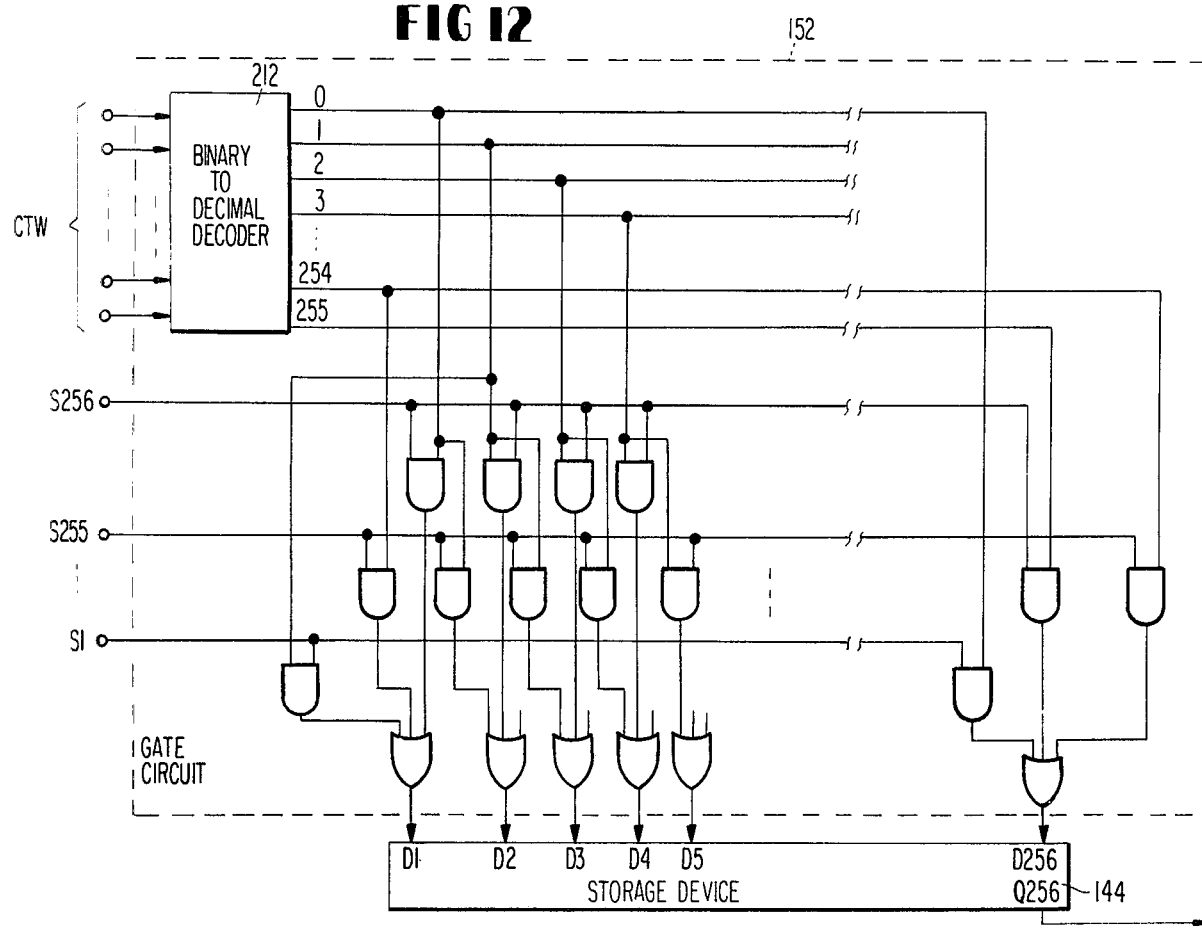
FIG. 12 is a function block diagram illustrating one form of a gate circuit which may be used in connection with the present invention.

Any suitable gating arrangement that will transfer signals differently between its input and output terminals in response to a control word may be used for the gate circuit 152. One possible arrangement parially shown in FIG. 12 permits the input segments S1-S256 to be output on any of the 256 data lines for storage in any of the 256 storage locations D1-D256. It can be seen, for example, that with a conventional binary to decimal decoder 212, up to 256 distinct control signals are provided from an eight bit control word CTW. Using an AND and OR gate arrangement (an expansion of that shown), any input segment can be applied to any data input terminal D1-D256 in accordance with the pattern determined by the gates.

Thus, for example, the segment S256 is applied to terminal D1 when the decoder output signal is decimal "0". Simultaneously, the segments S255-S1 are applied to data terminals D2-D256, respectively for a decimal "0" output signal from the decoder 212. In the illustrated arrangement, a decimal 1 shifts the segments one data terminal to the right, but any other pattern of response to the control word CTW may be readily implemented using such a technique.

Since there is no gating circuit in the embodiment of FIG. 9 and only two states of encoding are necessary, it will be appreciated that a very simple circuit such as a controlled bistable flip flop may be used to reverse line retrieval. Moreover, it will be appreciated that with a fixed segment rearrangement pattern, there is no need for an encode control circuit or a gate circuit in the FIG. 10 embodiment. Thus, the gating and encoding may be as simple or complex as desired with the limits of the number of segments available for rearrangement.

Figure 13:
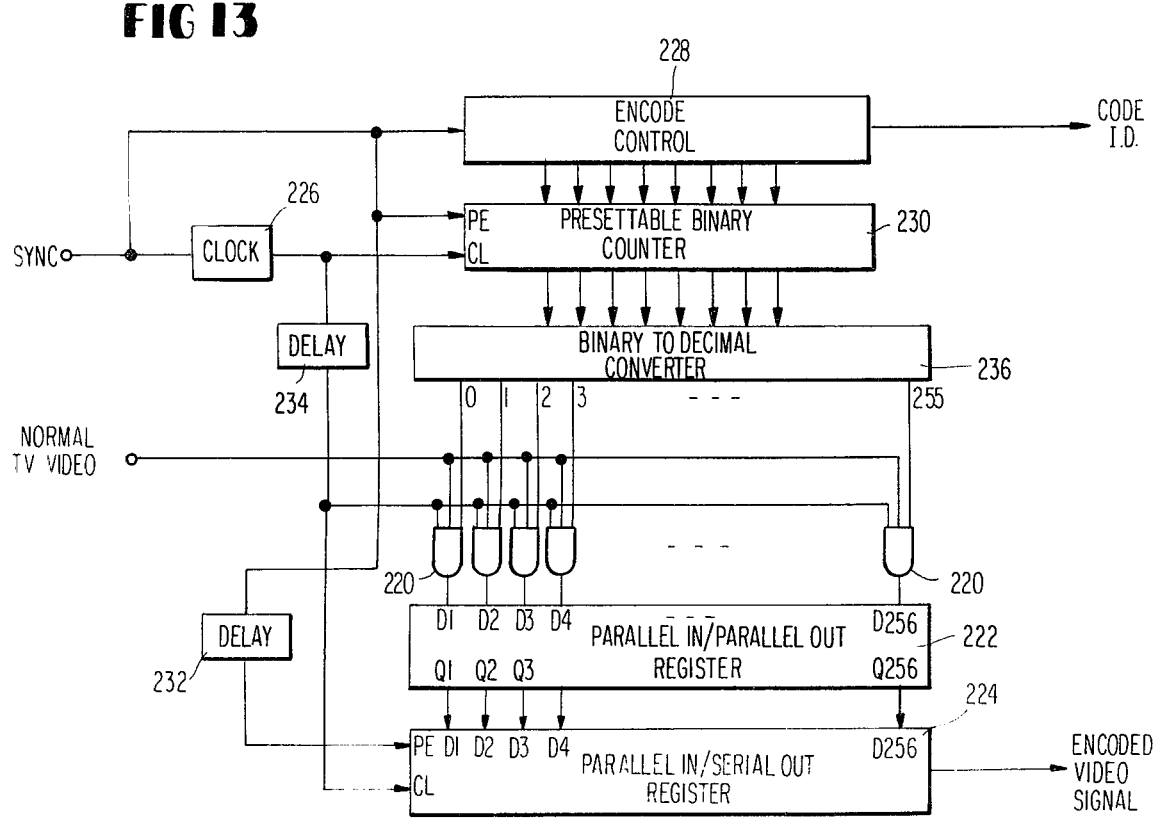
FIG. 13 is a functional block diagram illustrating an embodiment of an encoder according to the present invention wherein lines of the video signal are encoded upon initial storage; and, FIG. 14 is a functional block diagram illustrating an encoding station and a decoding station in accordance with the present invention.

FIG. 13 illustrates an embodiment of the invention in which the selected parts (e.g., segments of lines) of the normal TV video signal are stored in the rearranged order desired for transmission. The normal TV video is applied to a plurality of AND gates 220, one for each input terminal D of a suitable conventional parallel in/parallel out storage device or register 222. The output terminals Q of the register 222 are connected to corresponding input terminals D of a conventional parallel in/serial out storage device or register 224 whose serial output is the encoded video signal.

The parts of the normal TV video signal will be stored in the register 222 at storage locations determined by the sequence of gating of the AND gates 220.

One circuit for varying the sequence of storage locations is illustrated in FIG. 13. In this regard, the sync signal (e.g., horizontal sync) is applied to a conventional synchronized clock 226, to an encode control 228, to the preset enable input terminal PRE of a conventional presettable binary counter 230 and through a delay circuit 232 to the parallel read or enable input terminal PE of the register 224.

The output signal from the clock 226 is supplied to the clock input terminal CL of the counter 230 and through a delay circuit 234 to one input terminal of each of the AND gates 220 and to the clock input terminal of the register 224. The output signals from the counter 230 are applied in parallel to a conventional binary to decimal converter 236 and the 0-225 output signals from the converter 236 are applied to the respective input terminals of the AND gates 220.

In operation, the encode control 228 generates binary code word (e.g., as previously discribed in connection with FIG. 11) and this binary word is applied to the counter 230 as a preset signal. In the illustrated embodiment the counter 230 is an eight bit counter so the binary word from the encode control is an eight bit word.

The counter 230 is preset by the code word from the encode control 228 at the start of a horizontal line. The counter then counts 256 bits of the clock signal (if 256 video signal parts are to be stored), starting its count at the preset number. During one horizontal line, the output signal from the binary to decimal converter thus steps from the preset number until it arrives at the number before or after the preset number, depending on whether the counter 230 counts up or down.

As the counter 236 is stepped from the preset number through all its other outputs, the AND gates 220 are enabled in a corresponding sequence, one at a time. As an AND gate is enabled, the video signal preset at that time is stored in the location in the register 222 connected to that AND gate. At the end of a horizontal line, the stored line of video is shifted into the register 224 and is clocked out of this register for transmission as the encoded video signal while the next line of video is stored in the register 222. The code I.D. signal can also be transmitted with this encoded video signal as often as is necessary (depending on how often it is changed).

FIG. 14 illustrates an overall pay television system which may be constituted in accordance with the present invention. Of course, it will be appreciated that other secure video systems (e.g., "teletext" CATV or satellite) may also be operated in accordance with the techniques, and with the apparatus, disclosed and claimed herein without departing from the essential characteristics of the invention.

Referring to FIG. 14, the synchronizing and blanking signals as well as the normal TV video signal are provided to a video encoder 250 such as one of the previously disclosed encoders. The sync and blanking signals are also provided to a suitable conventional multiplexer 252 together with the encoded video signal and code I.D. from the video encoder 250.

The multiplexed signal from the multiplex 252 is supplied to a suitable conventional transmitter 254 which broadcasts the multiplexed signal at a suitable carrier frequency. This transmitted signal is received by the subscriber decoder and is demodulated by a conventional receiver/demodulator 256. The output from the receiver 256 is thus the encoded video signal with the code I.D. and the sync and blanking signals at appropriate locations in the demodulated signal.

A synch and code I.D. detector 258 detects the synch and blanking signals as well as the code I.D. signal in the demodulated video stream. Conventional television sync and blanking circuits may be utilized for detection of the sync and blanking signals, a since the code I.D. signals are in the received signal at known locations relative to the synch and blanking signals, the code I.D. may be detected in any conventional manner such as in conventional television scrambling and unscrambling systems.

The demodulated video stream from the receiver 256 is also supplied to a video decoder 260 together with the detected sync anc code I.D. signals. The video decoder reconstitutes the normal video TV signal in response to the sync and code I.D. signals reversing the encoding process that was performed at the television transmitter station. In this regard, if the encoder of the FIG. 10 embodiment is used to encode the video signal at the transmitter station, then an identical decoder may be used at the subscriber station.

For example, the detected sync signal would be applied to the input terminal labeled "SYNC" in FIG. 10 and the demodulated (encoded) video from the receiver 256 would be applied to the terminal labeled "NORMAL TV VIDEO" in FIG. 10. The detected code I.D. would apply to the gate circuit 152 as the control word CTW or to a suitable decoder, if necessary, to form a suitable control word that will reverse the previous encoding process.

It will be appreciated that, in the FIG. 14 embodiment, the sync and blanking signals are not encoded but, rather, are multiplexed with the encoded video signal from transmission in their normal form. Depending upon the manner in which the video signal parts are rearranged, this form of sync and blanking singal transmission may or may not be desirable.

Moreover, it should be noted that the Code I.D. may be supplied to the subscriber decoder in some manner other than in real time with the transmitted signal. For example, the code I.D. may be fixed for an entire program or for a series of programs or for a predetermined time period. This code I.D. may be set by the subscriber (e.g., upon receipt each month of a decoding schedule from the subscription TV operator) or may be transmitted to the decoder as a block of information covering a predetermined time interval, with the transmission being effected either over the air or by telephone.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A method for transmitting a television video signal in a nonstandard form comprising the steps of:
   (a) sequentially storing signals representing discrete samples of the video signal for one horizontal line in a first storage device;
   (b) transferring the stored signals for the one horizontal line from the first storage device into a second storage device while simultaneously modifying the stored signals to form an encoded video signal;
   (c) retrieving the stored signals from the second storage device; and (d) transmitting the encoded video signal.

2. The method of claim 1 including the steps of:
(a) generating a code signal identifying the manner in which the parts of said encoded video signal are modified in relation to said first predetermined sequence; and
(b) transmitting at least a portion of the code signal with the encoded video signal.

3. The method of claim 1 further including the step of storing signals representing samples of the video signal for a second horizontal line in the first storage device during the step of retrieving the stored signals from the second storage device.

4. The method of claim 1 wherein the stored signals are retrieved from the second storage device in a sequence other than the sequence in which they were stored in the first storage device.

5. The method of claim 1 wherein the step of modifying includes rearranging the sequence of the stored signals as they are transferred from the first storage device to the second storage device.

6. A method for decoding a television video signals that is transmitted in a nonstandard form wherein parts of the video signal are delayed in relation to other parts of the video signal and thereby form an encoded video signal having parts rearranged in sequence relative to a normal sequence in a determinable manner, the method comprising the steps of:
(a) receiving the encoded video signal;
(b) sequentially storing signals representing received samples of the encoded video signal for one part of the signal in a first storage device;
(c) transferring the stored signals for the one part of the signal in parallel from the first storage device into a second storage device;
(d) storing signals representing the received samples of the encoded video signal for a second part of the signal in the first storage device while retrieving the stored signals from the second storage device in a selectable sequence opposite that of sequence of rearrangement of said encoded sequence to form a decoded video signal; and
(e) applying said decoded video signal to a television receiver.

7. The method of claim 6 wherein at least a portion of a code signal identifying the manner in which the parts of said encoded video signal are rearranged in relation to said normal sequence is transmitted with the encoded video signal, and wherein the step of decoding includes detecting said at least a portion of the code signal transmitted with the encoded video signal and retrieving said stored signals in a sequence determined according to the detected code signal.

8. A method for transmitting a video signal in an encoded form comprising the steps of:
storing a predetermined portion of the video in a first storage location;
transferring the predetermined portion of the video signal from the first storage location to a second storage location for storage therein and altering the transferred portion in a determinable manner prior to storage in the second storage location; and,
transmitting the predetermined portion of the video signal from the second storage location in its altered form.

9. A system for transmitting a television video signal in a nonstandard form comprising:

means for generating a video signal having a plurality of parts arranged in a first predetermined sequence;
first and second storage means each for sequentially storing signals representing the parts of the video signal;
means for transferring the stored signals from the first storage means into the second storage means and for retrieving the stored signals in parallel from the second storage means in a selectable sequence other than said first predetermined sequence to form an encoded video signal; and
means for transmitting the encoded video signal.

10. The system of claim 9 including:
means for generating a code signal indentifying the manner in which the parts of said encoded video signal are rearranged in relation to said first predetermined sequence; and
means for transmitting at least a portion of the code signal with the encoded video signal.

11. The system of claim 9 including:
means for generating a code signal identifying the parts of said encoded video signal; and
means for transmitting at least portion of said code signal with the encoded video signal.

12. An encoder for transmitting an encoded video signal comprising:
storage means for storing a predetermined portion of the video signal in a first storage location, said storage means having a second storage location;
means for transferring said predetermined portion of the video signal from said first storage location to said second storage location and altering said transferred portion of the video signal in a determinable manner prior to storage in said second storage location; and,
means for transmitting said predetermined portion of the video signal from said second storage location in its altered form.

13. A method for transmitting a television video signal in a nonstandard form comprising the steps of:
(a) storing signals representing discrete samples of the video signals for one horizontal line in a first storage device;
(b) transferring the stored signals for the one horizontal line from the first storage device into a second storage device with the sequence of stored samples in the second storage device differing in a selectable manner from the sequence of samples in the first storage device;
(c) retrieving the stored samples from the second storage device in sequence to form an encoded video signal; and
(d) transmitting the encoded video signal.

14. A method for decoding a television video signal that is transmitted in a nonstandard form wherein parts of the video signal are delayed in relation to other parts of the video signal and thereby form an encoded video signal having parts rearranged in sequence relative to a normal sequence in a determinable manner, the method comprising the steps of:
(a) receiving the encoded video signal;
(b) storing signals representing received parts of the encoded video signal in a first storage device;
(c) transferring the stored signals from the first storage device into a second storage device with the stored sequence of parts in the second storage device differing from the sequence of parts in the first storage device in a manner opposite said determinable manner;

(d) retrieving the stored parts from the second storage device in sequence to form a decoded video signal; and (e) applying said decoded video signal to a television receiver.

15. The method of claim 6 or 14 wherein said samples of said encoded video signal are discrete sequential samples of said video signal along horizontal lines of a television raster.

16. A system for transmitting a television video signal in a nonstandard form comprising:

means for generating a video signal having a plurality of parts arranged in a first predetermined sequence;

first and second storage means each for storing signals representing parts of the video signal;

means for transferring the stored signals from the first storage means into a second storage means with the stored sequence of parts in the second storage means differing in a selectable manner from the sequence of parts in the first storage means;

means for retrieving the stored parts from the second storage device in sequence to form an encoded video signal; and means for transmitting the encoded video signal.

17. The apparatus of claim 15 or 16 wherein said parts of said video signal comprise discrete samples of said video signal along horizontal lines of a television raster.

18. A method for transmitting a television signal in a nonstandard form to prevent unauthorized reception of the signal comprising the steps of:

sequentially storing in a first storage means a plurality of successive parts of the television signal;

transferring the stored parts of the television signal from the first storage means into a second storage means wile simultaneously modifying the stored parts in a reversible manner so that a modified version of the first stored parts is stored in the second storage means;

retrieving the stored parts from the second storage means; and transmitting the retrieved stored parts as a television signal is a nonstandard form.

19. The method of claim 18 wherein the parts of the television signal are successive samples of the video signal comprising one horizontal line of video.

20. The method of claim 18 including the further step of sequentially storing a successive plurality of similar parts of the television signal in the first storage means while retrieving the stored, modified verison of the parts from the second storage means.

21. The method of claim 18 wherein the television signal is modified by modifying the sequence of succession of the stored parts.

22. The method of claim 18 including the steps of:
(a) generating a code signal identifying the parts of said encoded video signal; and
(b) transmitting at least a portion of said code signal with the encoded video signal.

23. A method for decoding a television signal that is transmitted in a nonstandard form wherein parts of the video signal are modified in a determinable manner to form an encoded video signal, comprising the steps of:
receiving the encoded video signal;
sequentially storing a plurality of successive parts of the received video signal in a first storage device;
transferring the stored parts from the first storage means into a second storage means while simultaneously modifying the stored parts in a manner opposite said determinable manner so that a decoded version of the received video signal is stored in the second storage means;
retrieving the stored parts from the second storage means as a decoded video signal; and
applying the decoded video signal to a television receiver.

24. The method of claim 23 wherein the parts of the television signal are successive samples of the video signal comprising one horizontal line of video.

25. The method of claim 23 including the further step of sequentially storing a successive plurality of similar parts of the received video signal in the first storage means while retrieving the decoded video signal from the second storage means.

26. The method of claim 23 wherein the stored parts are modified by rearranging their sequence during the transfer from the first storage device to the second storage device.

27. Apparatus for transmitting a television signal in a nonstandard form to prevent unauthorized reception of the signal, comprising:

means for generating a video signal having a plurality of parts;

first and second storage means each for storing the parts of the video signal;

means for transferring stored parts from the first storage means to the second storage means while simultaneously modifying the parts in a reversible manner so that a modified version of the parts is stored in the second storage means;

means for retrieving the modified version of the stored parts from the second storage device as an encoded video signal; and means for transmitting the encoded video signal.

28. The apparatus of claim 27 wherein the parts of the television signal are successive samples of the video signal comprising one horizontal line of video.

29. Apparatus for decoding a television signal that is transmitted in a nonstandard form wherein parts of the video signal are modified in a determinable manner to form an encoded video signal, comprising:

means for receiving the encoded video signal;

first and second storage means each for storing the parts of the video signal;

means for transferring stored parts from the first storage means to the second storage means while simultaneously modifying the parts in a manner opposite said determinable manner so that an unmodified version of the parts is stored in the second storage means; and means for retrieving the unmodified version of the parts from the second storage means as a decoded video signal.

30. The apparatus of claim 29 wherein the parts of the television signal are successive samples of the video signal comprising one horizontal line of video.

31. A method for transmitting a television signal in a nonstandard form to prevent unauthorized viewing of a television program, comprising the steps of:

generating a television signal comprising both timing and video information;

dividing the video information portion of the television signal into successive parts;

storing a first plurality of the parts in a first storage device;

transferring the stored first plurality of parts from the first storage device to the second storage device;

retrieving the stored first plurality of parts from the second storage device in a modified form to thereby provide an encoded video signal while simultaneously storing a second plurality of the parts in the first storage device;

combining the modified parts retrieved from the second storage device with unmodified timing information to form a composite television signal; and transmitting the composite television signal.

32. A method for transmitting a television signal in a nonstandard form to prevent unauthorized viewing of a television program, comprising the steps of:

generating a television signal comprising both timing and video information;

dividing the video information portion of the television signal into successive parts;

storing a first plurality of the parts in a first storage device;

transferring the stored first plurality of parts from the first storage device to the second storage device;

modifying the plurality of parts as they are transferred from the first storage device to the second storage device so that they are stored in the second storage device in a modified form;

retrieving the stored first plurality of parts from the second storage device in the modified form to thereby provide an encoded video signal while simultaneously storing a second plurality of the parts in the first storage device;

combining the modified parts retrieved from the second storage device with unmodified timing information to form a composite television signal; and transmitting the composite television signal.

33. The method of claim 31 wherein the plurality of parts are modified upon being stored in the first storage device so that they are stored in both the first and second storage devices in, the modified form.

34. The method of claim 32 or 33 wherein the modification includes rearranging the sequence of the parts.

35. The method of claim 31 wherein the stored parts are successively retrieved from the second storage device in a selectable sequence to provide the modified form.

36. A method for transmitting a television signal in a nonstandard form to prevent unauthorized viewing of a television program, comprising the steps of:

(a) sequentially storing in a first storage means signals representing a first plurality of successive parts of a television video signal while simultaneously modifying the representative signals so as to form an encoded video signal in the first storage means;

(b) transferring the encoded video signal from the first storage means to a second storage means; and (c) repeating step (a) for a second plurality of parts of the television video signal while simultaneously retrieving the encoded video signal from the second storage means.

37. The method of claim 36 wherein the step of modifying includes gating signals representing successive parts of the video signal into non-sequential memory locations in the first storage means so that the signals are rearranged in sequence relative to the unmodified video signal.

38. Apparatus for transmitting a television signal in nonstandard form, comprising:

means for generating a video signal comprising successive parts;

first and second storage means each for storing a plurality of the successive parts of the video signal;

means for transferring the parts stored in the first storage means to the second storage means in parallel;

means for gating successive parts of the video signal into non-sequential memory locations of one of the first and second storage means so that the parts of the video signal stored in said one storage means are rearranged in sequence relative to the sequence in which they were generated; and means for sequentially retrieving the plurality of parts stored in the second storage means to form an encoded video signal and transmitting said encoded video signal.

39. The apparatus of claim 38 wherein said gating means gates the parts of the video signal into said first storage means.

40. The apparatus of claim 38 wherein said gating means gates the parts of the video signal from said first storage means into said second storage means.

* * * * *

UNITED STATES PATENT AND TRADEMARK OFFICE
CERTIFICATE OF CORRECTION

PATENT NO. : 4,405,942

DATED : September 20, 1983

INVENTOR(S) : Robert S. Block and John R. Martin

It is certified that error appears in the above-identified patent and that said Letters Patent is hereby corrected as shown below:

Column 5, line 56, change "while" to --whole--.

Column 7, line 7, change "or" to --of--.

Column 8, line 16, change "reprocucible" to --reproducible--.

Column 11, line 33, change "rerverse" to --reverse--;

line 63, change "deu-" to --se- --.

Column 16, line 5, delete "a".

Signed and Sealed this

Thirteenth Day of December 1983

[SEAL]

Attest:

GERALD J. MOSSINGHOFF

Attesting Officer     Commissioner of Patents and Trademarks